(12) United States Patent
Butzmann

(10) Patent No.: US 10,232,728 B2
(45) Date of Patent: Mar. 19, 2019

(54) ELECTROCHEMICAL COMPOSITE STORAGE SYSTEM

(71) Applicant: Robert Bosch GmbH, Stuttgart (DE)

(72) Inventor: Stefan Butzmann, Schalksmühle (DE)

(73) Assignee: Robert Bosch GmbH, Stuttgart (DE)

( * ) Notice: Subject to any disclaimer, the term of this patent is extended or adjusted under 35 U.S.C. 154(b) by 368 days.

(21) Appl. No.: 15/110,479

(22) PCT Filed: Dec. 30, 2014

(86) PCT No.: PCT/EP2014/079418
§ 371 (c)(1),
(2) Date: Jul. 8, 2016

(87) PCT Pub. No.: WO2015/104200
PCT Pub. Date: Jul. 16, 2015

(65) Prior Publication Data
US 2016/0332528 A1 Nov. 17, 2016

(30) Foreign Application Priority Data

Jan. 10, 2014 (DE) .................. 10 2014 200 336

(51) Int. Cl.
*H02J 1/10* (2006.01)
*B60L 11/18* (2006.01)
(Continued)

(52) U.S. Cl.
CPC ....... *B60L 11/1853* (2013.01); *B60L 11/1855* (2013.01); *H01M 10/4257* (2013.01);
(Continued)

(58) Field of Classification Search
CPC ........................................................ H02J 1/10
See application file for complete search history.

(56) References Cited

U.S. PATENT DOCUMENTS

| 4,502,000 A | 2/1985 | Mashikian |
| 6,046,573 A | 4/2000 | Wikstroem |

(Continued)

FOREIGN PATENT DOCUMENTS

| DE | 102009046605 | 5/2011 |
| DE | 102010009260 | 8/2011 |

(Continued)

OTHER PUBLICATIONS

International Search Report for Application No. PCT/EP2014/079418 dated Mar. 26, 2015 (English Translation, 3 pages).

(Continued)

*Primary Examiner* — Fritz M Fleming
(74) *Attorney, Agent, or Firm* — Michael Best & Friedrich LLP

(57) ABSTRACT

The invention relates to an electrochemical composite storage system and to an electrical circuit comprising an electrochemical composite storage system of this type. The circuit and system comprise branches (ST1, ST2, ST3, ST4, ST5, ST6), which are connected in parallel, of electrochemical storage modules (10), said storage modules (10) having first connection terminals and each module having an electrical circuit. The composite storage system is designed to operate the branches (ST1, ST2, ST3, ST4, ST5, ST6) inside the composite storage system optionally as a current source or a voltage source, by means of the electrical circuits.

10 Claims, 4 Drawing Sheets

(51) Int. Cl.
*H02J 7/00* (2006.01)
*H01M 10/42* (2006.01)

(52) U.S. Cl.
CPC .............. *H02J 1/10* (2013.01); *H02J 7/0016* (2013.01); *H02J 7/0063* (2013.01); *H01M 2010/4271* (2013.01); *H02J 2007/0067* (2013.01); *Y02T 10/7005* (2013.01); *Y02T 10/705* (2013.01)

(56) References Cited

U.S. PATENT DOCUMENTS

| | | | | |
|---|---|---|---|---|
| 2004/0056534 | A1* | 3/2004 | Linke | H02J 1/08 307/75 |
| 2009/0289598 | A1* | 11/2009 | Tsukamoto | H01M 10/441 320/118 |
| 2012/0091963 | A1* | 4/2012 | Vance | B60L 11/1855 320/118 |
| 2012/0274140 | A1* | 11/2012 | Ganor | H02J 7/0011 307/71 |
| 2012/0319657 | A1 | 12/2012 | Ke et al. | |

FOREIGN PATENT DOCUMENTS

| | | |
|---|---|---|
| DE | 102010040163 | 12/2011 |
| JP | 2007135375 A | 5/2007 |
| JP | 2008278700 A | 11/2008 |
| JP | 2009033936 A | 2/2009 |
| JP | 2009089536 A | 4/2009 |
| JP | 2010148242 A | 7/2010 |
| JP | 2011125144 A | 6/2011 |
| JP | 2012533979 A | 12/2012 |
| JP | 2013077452 A | 4/2013 |
| WO | 0215363 | 2/2002 |
| WO | 2013046314 | 4/2013 |

OTHER PUBLICATIONS

Various Authors, "LTC3780—High Efficiency, Synchronous, 4-Switch Buck-Boost Controller," Announcement Linear Technology, XX, XX, Jan. 1, 2005, pp. 1-28, XP002422285.

* cited by examiner

ELECTROCHEMICAL COMPOSITE STORAGE SYSTEM

BACKGROUND OF THE INVENTION

The present invention relates to an electrochemical composite storage system comprising a plurality of electrochemical storage modules. The present invention particularly relates to an electrochemical composite storage system which is designed to operate a plurality of strings of storage modules, which strings are connected in parallel, without unequal states of charge or undesired compensation currents occurring.

Electrochemical storage modules with a simple half- or full-bridge as the coupling unit are known from the prior art. Modules of this kind can be used to set the terminal voltage of a respective module in certain limits. However, current regulation is not possible with units of this kind. A storage module which is called a UniBB (Universal Buck-Boost) module is also known from the prior art, said module comprising one or more rechargeable battery cells together with a coupling unit, wherein the coupling unit also contains an inductance. This module can be used both as a voltage source and as a current source. Since a module of this kind is designed for voltages of below 60 V, it is necessary, in particular for applications which have extremely large power requirements (for example vehicles in the automobile industry), for a plurality of modules to be connected in series in order to reach the available power at a controllable current. In addition, it may be necessary to connect these serial strings in parallel with one another in order to further increase the available current. However, in the normal case according to the prior art, connecting strings in parallel leads to undesired compensation currents between the strings on account of generally unequal states of charge. A possible design of a UniBB module is discussed in greater detail further below in conjunction with FIG. 4.

One object of the present invention is to provide an electrochemical energy store which is of modular construction and remedies the disadvantages of the prior art.

SUMMARY OF THE INVENTION

According to the invention, the abovementioned object is achieved by an electrochemical composite storage system comprising strings of electrochemical storage modules, which strings are connected in parallel. In this case, the electrochemical storage modules can comprise an electrochemical storage cell or a plurality of electrochemical storage cells and a processing unit. The storage module is designed to provide electrical energy which is stored in the electrochemical cell or the electrochemical cells and has the characteristics of a voltage source and/or a current source at output-end terminals of the storage module by means of the processing unit. To this end, the storage module has first connection terminals and in each case one electrical circuit, wherein the electrochemical composite storage system is designed to operate the strings within the electrochemical composite storage system selectively as a current source or as a voltage source (inter alia by means of the electrical circuit). To this end, the electrochemical composite storage system can further have a processing unit (which is superordinate to the storage modules) by means of which control commands can be sent to the individual storage modules and the energy output characteristics of said control commands can therefore be individually set. Selective driving as a current source or as a voltage source can ensure no undesired compensation currents flow between the strings which are connected in parallel. In addition, charge compensation of unequal states of charge between the strings can be controlled in a targeted manner.

The electrochemical composite storage system is preferably designed to operate a first string of storage modules which are connected in series as a voltage source and a second string of electrochemical storage modules as a current source. Since the second string is operated as a current source, a current flow which is independent of the set current is not possible through the second string. Therefore, undesired compensation currents are avoided.

As an alternative or in addition, the electrochemical composite storage system can be designed to operate all of the strings of the storage module, with the exception of the first string, as a current source or in a blocking mode. In other words, the first string is further connected as a voltage source, while all of the other strings either have the characteristics of a current source or are blocked (that is to say interrupted). In this way, no undesired compensation currents can flow in the entire electrochemical composite storage system. Moreover, unequal states of charge can be avoided or compensated in a targeted manner.

The electrochemical composite storage system is further preferably designed to operate a first storage module of a string under consideration as a current source, and to operate a further storage module of the same string as a voltage source or in a bypass mode. In this way, compensation currents between the strings can be prevented since accurate voltage control can be performed. In particular, the storage modules which function as a voltage source can operate as unregulated voltage sources. The number of storage modules which function as a voltage source depends on the level of the required total voltage which is to be supplied by the string or the electrochemical composite storage system. In this case, control is performed in a manner which stabilizes the same voltage level for each possible state of charge of the strings. In this way, all of the storage modules of the same string in any desired combination are operated as a voltage source or in a bypass mode. To this end, both the buck and also the boost mode can be selected for the storage module which is operating in the current source mode. This depends on the states of charge of the cells in the strings. This ensures that no compensation currents flow between the strings which are connected in parallel. Depending on the driving of the modules, operation as a direct or alternating current source of the strings which are connected in parallel is possible, wherein said strings are controlled in a synchronized manner in order to exhibit identical voltages, so that the currents can be added up.

Each of the strings of the composite storage system preferably has a contactor by means of which the respective string is designed to be incorporated into the composite storage system or electrically disconnected from the composite storage system. The contactors can be driven by the storage modules of the string itself if one of the storage modules identifies a defect and signals switching off of the contactor in the string. As an alternative or in addition, a respective contactor can also be driven by a processing unit which is superordinate to the strings. This allows flexible adaptation to currents which are to be supplied by the electrochemical composite storage system and disconnection of defective strings.

The storage modules are preferably designed as UniBB modules. UniBB modules allow a large number of different characteristics of the electrical terminal power when using one and the same electrochemical energy store within the UniBB module. The electrical design of said UniBB module is cost-effective, driving is simple and the long service life of said UniBB module leads to a high-quality electrochemical composite storage system. In addition, it is possible to extend the electrochemical composite storage system in a modular manner particularly when all of the storage modules are designed as UniBB modules.

An electrical circuit comprising an electrical load and a first composite storage system and also a second composite storage system is proposed according to a second aspect of the present invention. The two composite storage systems can be designed as electrochemical composite storage systems, as have been described in detail above. According to the invention, the load is arranged electrically between the first composite storage system and the second composite storage system. In other words, a first connection of the load is connected to a first output of the first composite storage system, and a second connection of the load is connected to a first connection of the second composite storage system. The respective second connections of the first and the second composite storage system can be connected, for example, to electrical ground. In addition, the load can be bridged by a switch. In addition, a second switch and a third switch can be provided between the load and the first connections of the electrochemical composite storage systems in order to disconnect the load from the electrochemical composite storage systems.

BRIEF DESCRIPTION OF THE DRAWINGS

Exemplary embodiments of the invention will be described in detail below with reference to the accompanying drawings, in which.

DETAILED DESCRIPTION

Figure 1:
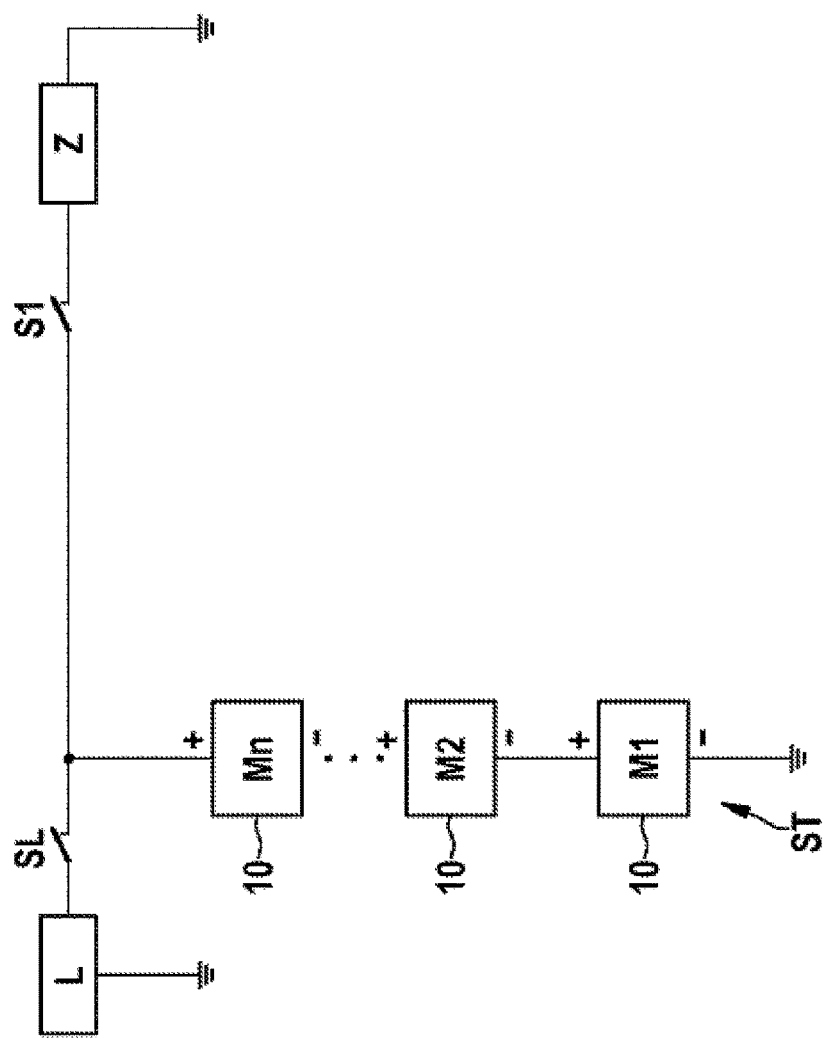
FIG. 1 is a schematic illustration of an electrical circuit comprising a single string of storage modules which are connected in series.

FIG. 1 shows a circuit diagram of a schematic design of a series circuit comprising UniBB modules 10 as storage modules. The storage modules are designated M1, M2 and Mn. It goes without saying that more storage modules could be added in order to increase the string voltage. A branch, comprising a charger L and a first switch SL, and a further branch, comprising a load Z and a second contactor S1, are provided in parallel with the string ST of UniBB modules 10. The UniBB modules 10 are oriented electrically in the same direction. In this case, the respective negative pole of a UniBB module 10 is oriented in the direction of the electrical ground of the string ST, while the positive pole points in the direction of the two other strings. A processing unit (not illustrated) is designed to switch the modules M1, M2, Mn to a bypass, charging or blocking mode selectively as a voltage source in the buck or boost mode or a current source in the buck or boost mode. In this case, the processing unit can be arranged within the illustrated composite storage system or outside said composite storage system.

Figure 2:
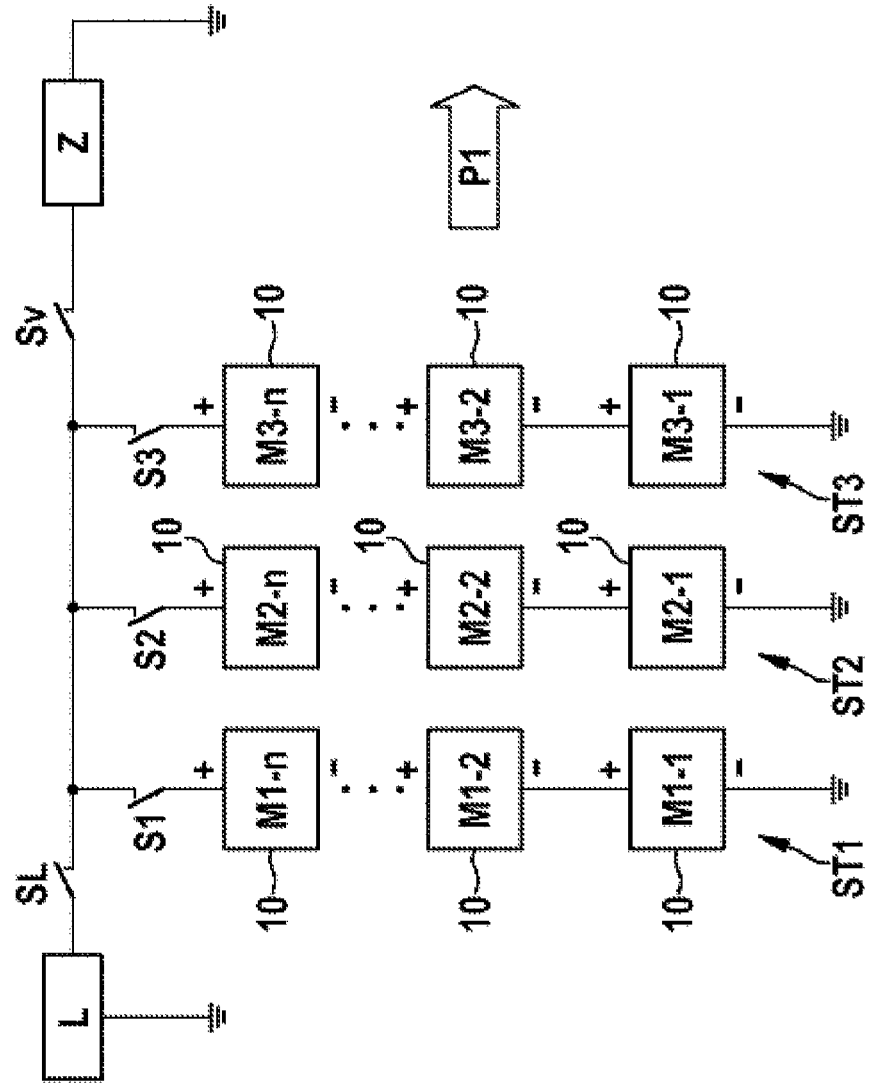
FIG. 2 shows an electrical circuit according to one exemplary embodiment of the present invention.

FIG. 2 shows a schematic circuit diagram of an electrical circuit according to an exemplary embodiment of the present invention which has three strings ST1, ST2, ST3, which are connected in parallel, of in each case three UniBB modules 10 (identified by M1-1 to M3-$n$) which are illustrated by way of example. An arrow P1 indicates that the illustrated strings ST1, ST2, ST3 could be extended by the further parallel connection of additional strings and therefore the rated current of the illustrated electrical circuit could be correspondingly increased. The strings ST1, ST2, ST3 have respective contactors S1, S2 and S3 by means of which they are connected to a busbar between a charger L and an electrical load Z. A first contactor SL is arranged between the charger L and the busbar, while a second contactor Sv is arranged between the busbar and the electrical load Z. If all of the contactors S1, S2, S3 are closed, the currents of the three strings can be added up given a suitable control method for the modules. The contactors S1, S2, S3 are intended to be understood only functionally and can also be realized by a blocking mode within one storage module 10 of the strings ST1, ST2, ST3. In the blocking mode, all of the switches (also called "semiconductor valves") within the storage module 10 in question are switched off. Therefore, in principle, it is necessary for one string to function as a voltage source and all of the other strings to function as a current source in order to allow parallel connection. If the load is a voltage source or, for example, a capacitive load, all of the strings can also be operated as current sources. In the case of the capacitive load, the currents are then regulated such that the desired voltage is established across the capacitor. All of the strings can be charged in parallel by means of the charger L. To this end, the contactors S1, S2, S3, SL are closed or only the contactors of the strings which are to be charged are closed. The charging method differs on a case-to-case basis. If only one string is charged, the charging method can be dispensed with as would be the case if only one string of UniBB modules 10 which are connected in series were contained in the electrical circuit. If all of the strings are intended to be charged in parallel, the charger L has to function as a voltage source and current control takes place within the strings ST1, ST2, ST3. This takes place under the assumption that no compensation currents are intended to flow between the strings. For the sake of completeness, it should be mentioned that the illustrated arrangement could also be used for parallel connection of strings of a different kind (for example with a capacitor or modules with reversed polarities, as are known in the prior art) and the corresponding operating method could be carried out in a similar way. It is characteristic of the operating method that in each case one module per string is operated as a current source, while the rest of the modules operate in the voltage source mode or—depending on the instantaneous voltage requirement—remain in the bypass mode.

Figure 3:
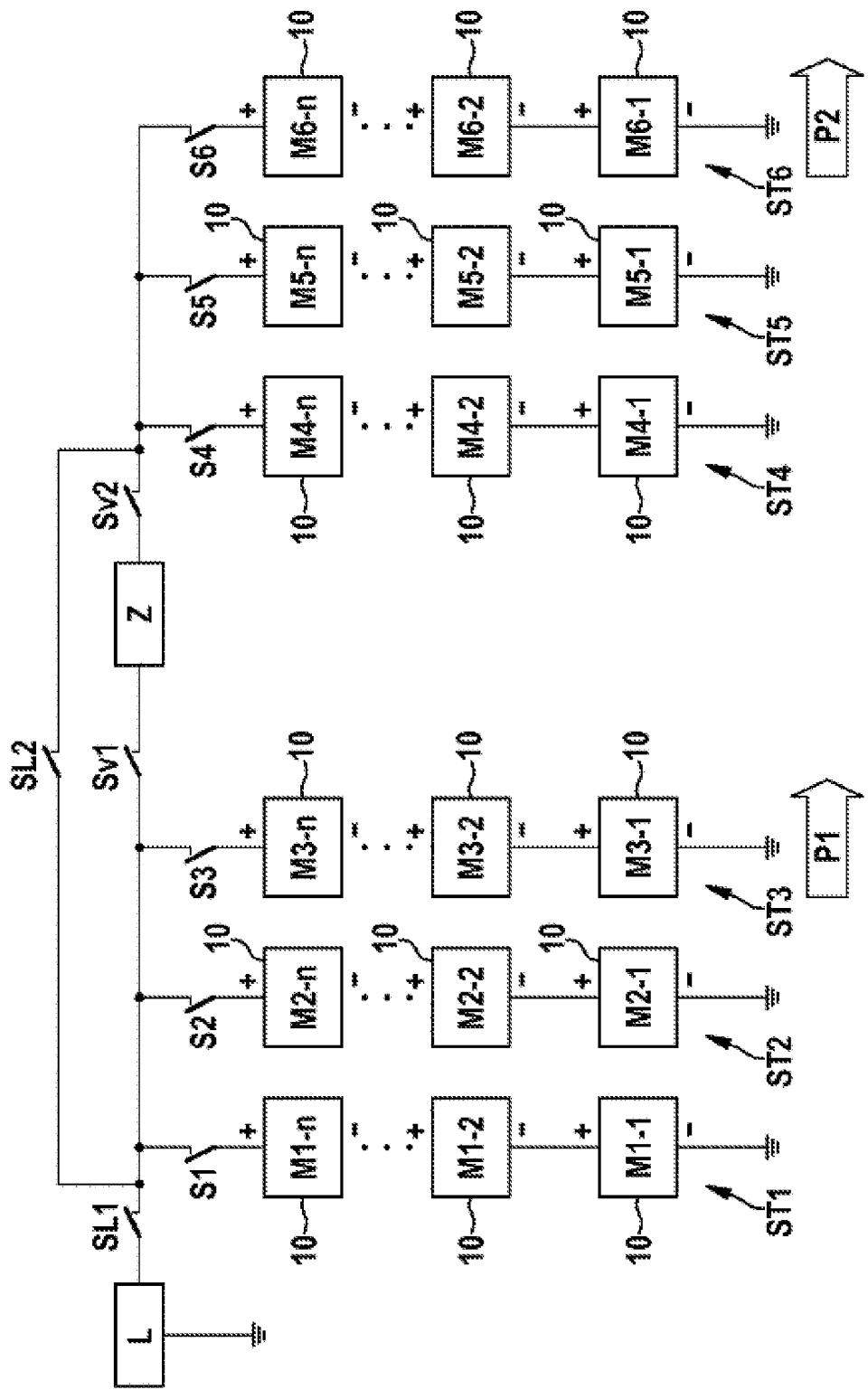
FIG. 3 shows an electrical circuit according to a second exemplary embodiment of the present invention.

FIG. 3 shows a further embodiment of an electrical circuit according to the present invention. In said figure, strings ST1, ST2, ST3 and, respectively, ST4, ST5, ST6 which are connected in parallel are illustrated on each side of an electrical load Z, it being possible to extend said strings with additional strings in any desired manner in accordance with the arrows P1, P2. The UniBB modules 10 of the strings ST1, ST2, ST3 and, respectively, ST4, ST5, ST6 are consecutively numbered M1-1 to M6-$n$. The negative poles of said UniBB modules are oriented in the direction of a respective string ground, while the positive poles of said UniBB modules are oriented in the direction of a respective common busbar to which they are connected by means of a respective string contactor S1, S2, S3 or S4, S5, S6. A load contactor Sv1 is connected between the first three strings S1, S2, S3 and the electrical load Z. A second load contactor Sv2 is connected between the electrical load Z and the strings S4, S5, S6. The busbars on either side of the load Z are electrically connected to one another by means of a further contactor SL2. A charger L is connected to the busbar in parallel with the first string ST1 by means of a charger contactor SL1. The control method for the illustrated electrical circuit in a discharge mode provides that either the strings ST1, ST2, ST3 or the strings ST4, ST5, ST6 are in the bypass mode. Therefore, both positive and also negative voltages and currents can be provided for the electrical load Z. Here, it is also characteristic of the operating method for in each case one module per string to operate in the current source mode, while the rest of the modules of the same string operate in the voltage source mode or—depending on the instantaneous voltage requirement—are in the bypass mode. In accordance with the arrangement illustrated in FIG. 2, all strings of one side (that is to say the strings ST1, ST2, ST3 and, respectively, the strings ST4, ST5, ST6) can be charged in parallel by the contactors SL1, S1, S2, S3 and, respectively, S4, S5, S6 in conjunction with SL2 being closed. It goes without saying that the strings ST1, ST2, ST3, ST4, ST5, ST6 can also be charged individually by the respective string contactor S1, S2, S3, S4, S5, S6 in conjunction with the charging contactor SL1 or the additional contactor SL2 being closed. If all of the strings are intended to be charged in parallel, the charger L has to function as a voltage source. In this case, the current control also takes place in the strings ST1, ST2, ST3 and, respectively, ST4, ST5, ST6. This also takes place under the assumption that no compensation currents are intended to flow between the strings ST1, ST2, ST3 and, respectively, ST4, ST5, ST6.

Figure 4:
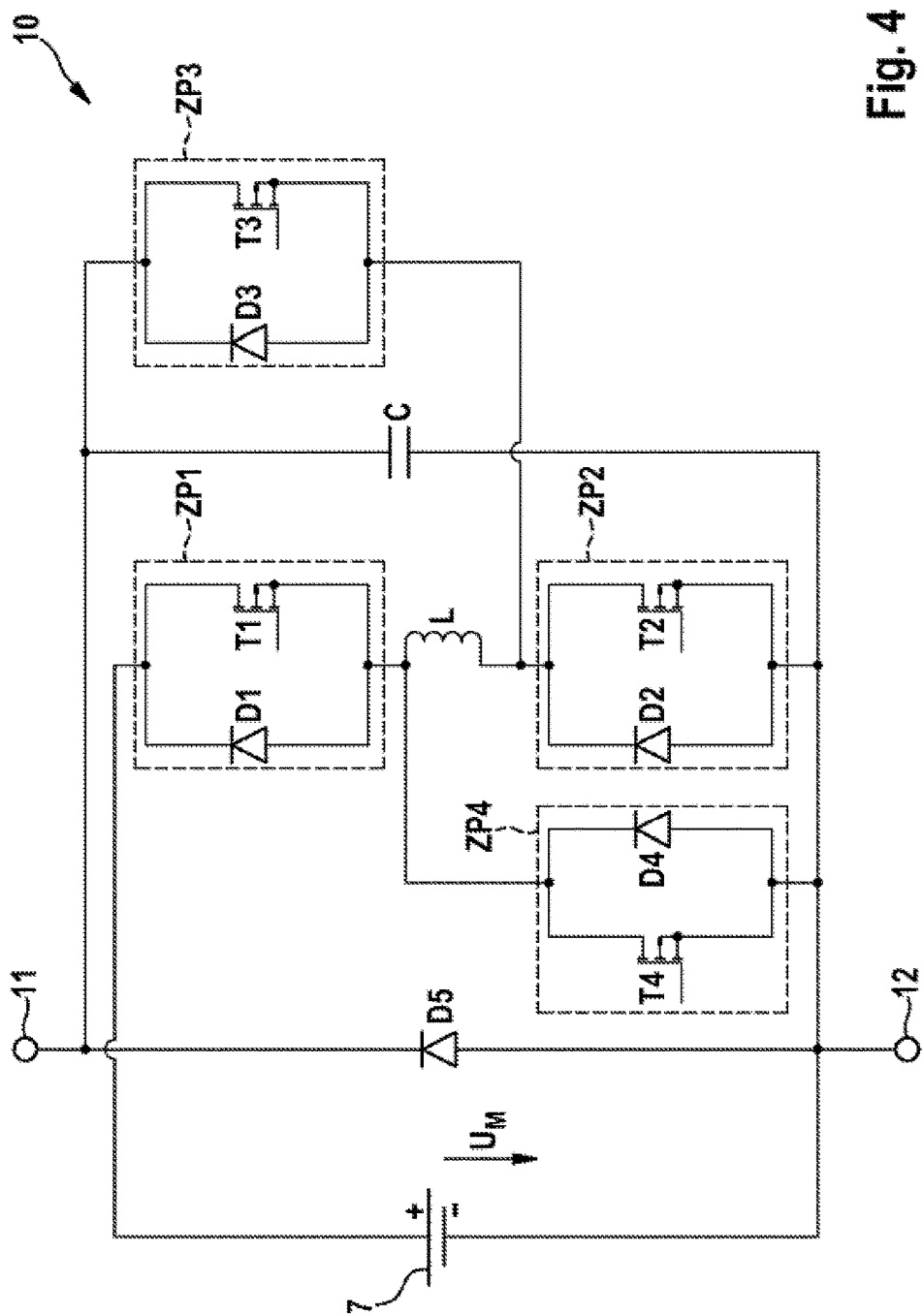
FIG. 4 shows a schematic design of an exemplary embodiment of a storage module in the form of a UniBB module.

FIG. 4 shows the circuit diagram of an exemplary embodiment of a UniBB module 10. By means of a first connection 11 and a second connection 12, the UniBB module 10 is designed to be connected up with further UniBB modules 10 to form a string. Four semiconductor switches T1, T2, T3, T4, which are preferably designed as MOSFETs or IGBTs, together with associated freewheeling diodes D1, D2, D3, D4, are arranged between the first connection 11 and the second connection 12. The semiconductor switches T1 to T4 can be combined with the respective freewheeling diodes D1 to D4 as electrical two-pole networks ZP1 to ZP4. In this case, a first connection of the first two-pole network ZP1 is connected to a positive connection of the energy store 7. A second connection of the first two-pole network ZP1 is connected firstly to a first connection of the fourth two-pole network ZP4 and secondly, via a coil L, to a first connection of the second two-pole network ZP2 and also to a second connection of the third two-pole network ZP3. A first connection of the third two-pole network ZP3 is connected to the first connection 11 of the UniBB module 10. A first connection of a capacitor C, of which the second connection is connected to the second connection of the second two-pole network ZP2 or to the second connection of the fourth two-pole network ZP4, is also connected to the first connection 11. The second connections of the second two-pole network ZP2 or of the fourth two-pole network ZP4 are connected firstly to the second connection 12 of the UniBB module 10 and secondly to a second connection of the electrical energy store 7. The energy store 7 provides a module voltage $U_M$. The illustrated UniBB module 10 has a positive pole at the first connection 11 and a negative pole at the second connection 12. Control lines for driving the semiconductor switches T1 to T4 are not illustrated for reasons of clarity. The same applies for current sensors. The electrical energy store 7 can comprise one or more electrochemical cells or other electrical energy stores which, in this case, jointly provide the module voltage $U_M$. The UniBB module 10 can assume a plurality of different operating states, depending on how the semiconductor switches T1 to T4 are operated. In particular, a bypass, a voltage source in the buck or boost mode, a current source in the buck or boost mode, a charging circuit and blocking can be realized.

Even though the aspects according to the invention and advantageous embodiments have been described in detail with reference to the exemplary embodiments explained in conjunction with the attached figures of the drawing, modifications and combinations of features of the illustrated exemplary embodiments are possible for a person skilled in the art without departing from the scope of the present invention for which the scope of protection is defined by the attached claims.

The invention claimed is:

1. An electrochemical composite storage system comprising
strings (ST1, ST2, ST3, ST4, ST5, ST6) of electrochemical storage modules (10), which strings are connected in parallel,
wherein each of the storage modules (10) have first connection terminals and a two-pole network, wherein the composite storage system is designed to operate the strings (ST1, ST2, ST3, ST4, ST5, ST6) within the electrochemical composite storage system selectively as a current source or as a voltage source by means of the two-pole network of the storage modules in the string.

2. The electrochemical composite storage system as claimed in claim 1, which is designed to operate a first string (ST1, ST2, ST3, ST4, ST5, ST6) as a voltage source and a second string (ST1, ST2, ST3, ST4, ST5, ST6) as a current source.

3. The electrochemical composite storage system as claimed in claim 2, which is designed to operate all of the strings (ST1, ST2, ST3, ST4, ST5, ST6), with the exception of the first string (ST1, ST2, ST3, ST4, ST5, ST6), as a current source or in a blocking mode.

4. The electrochemical composite storage system as claimed in claim 1, which is designed to operate a first storage module (10) of a string (ST1, ST2, ST3, ST4, ST5, ST6) as a current source, and to operate a further storage module (10) of the same string (ST1, ST2, ST3, ST4, ST5, ST6) as a voltage source or in a bypass mode.

5. The electrochemical composite storage system as claimed in claim 1, which is designed to operate all further storage modules (10) of the same string (ST1, ST2, ST3, ST4, ST5, ST6) as voltage sources or in a bypass mode.

6. The electrochemical composite storage system as claimed in claim 1, wherein operation as a current source is realized by buck or boost operation.

7. The electrochemical composite storage system as claimed in claim 1, wherein the composite storage system is designed to operate parallel strings (ST1, ST2, ST3, ST4, ST5, ST6) as an alternating current source.

8. The electrochemical composite storage system as claimed in claim 1, wherein each string (ST1, ST2, ST3, ST4, ST5, ST6) comprises a contactor (S1, S2, S3, S4, S5, S6) by means of which the string (ST1, ST2, ST3, ST4, ST5, ST6) is designed to be incorporated into the composite storage system or disconnected from the composite storage system.

9. The electrochemical composite storage system as claimed in claim 1, wherein the storage modules (10) are UniBB modules.

10. An electrical circuit comprising
a load (Z) and
a first composite storage system (ST1, ST2, ST3) and a second composite storage system (ST4, ST5, ST6) as claimed in claim 1,
wherein the load (Z) is arranged electrically between the first composite storage system (ST1, ST2, ST3) and the second composite storage system (ST4, ST5, ST6).

* * * * *